United States Patent [19]

Kersting et al.

[11] 4,153,171

[45] May 8, 1979

[54] RESIN-COATED GLASS ARTICLES

[75] Inventors: R. James Kersting; James J. Harris, both of Pittsburgh, Pa.

[73] Assignee: Arco Polymers, Inc., Philadelphia, Pa.

[21] Appl. No.: 925,509

[22] Filed: Jul. 17, 1978

[51] Int. Cl.² .................... B65D 11/16; B32B 17/10
[52] U.S. Cl. .................................. 215/12 R; 428/35; 428/441
[58] Field of Search ............... 215/12 R; 428/35, 441; 526/281

[56] References Cited

U.S. PATENT DOCUMENTS

| | | | |
|---|---|---|---|
| 2,799,668 | 7/1957 | Anderson et al. | 526/821 |
| 2,934,527 | 4/1960 | McKay et al. | 526/821 |
| 3,320,222 | 5/1967 | Cohen | 526/821 |
| 3,467,637 | 9/1969 | Prucnal | 526/821 |
| 3,494,897 | 2/1970 | Reding et al. | 526/821 |

Primary Examiner—William R. Dixon, Jr.
Attorney, Agent, or Firm—Lewis J. Young

[57] ABSTRACT

Articles of glass are coated with copolymers of ethylene and 2-norbornenes or terpolymers of ethylene, 2-norbornenes and 1-butene. The coating serves to reduce shatter of the glass and its scatter on breaking. Resin-coated bottles are especially useful for bottling carbonated beverages to prevent flying glass if the bottle is dropped or explodes.

2 Claims, No Drawings

RESIN-COATED GLASS ARTICLES

BACKGROUND OF THE INVENTION

This invention relates to coated glass articles. More particularly it relates to coated glass bottles normally used to bottle carbonated beverages.

When dropped onto hard surfaces, or struck against hard objects, glass bottles may break. When the bottles contain carbonated beverages, the bottles may break with explosive force, sending glass particles flying for considerable distances.

It is, therefore, desirable to coat these bottles with a resin film which will provide protection against scratches, bumps, and even dropping of the bottle. The desirable coating should also have a degree of adherence to the glass surface which will retain the glass fragments within a limited area if the bottle does break.

SUMMARY OF THE INVENTION

We have now found that a glass article coated with certain narrow molecular weight distribution copolymers of ethylene and 2-norbornenes or their terpolymers with 1-butene provide the desired resistance to scratching, bumps, and glass scatter when dropped.

DETAILED DESCRIPTION OF THE INVENTION

The co- and terpolymers useful in the coatings of this invention are polymers containing from 91.5 to 98.5 mole percent of total polymer of ethylene, 0.0 to 2.5 mole percent of 1-butene, and 1.5 to 6.0 mole percent of a monomer selected from the group consisting of 2-norbornene, 5-methyl-2-norbornene, and 5-ethyl-2-norbornene. The preferred polymers have a relatively narrow molecular weight distribution compared to polyethylene. Thus, the distribution, as measured by the ratio of melt index at 10 kilograms load to the melt index at 2 kilograms load at 190° C. is preferably less than 10. The preferred density of the polymers is between 0.930 and 0.950 grams per cubic centimeter. The polymers are coated onto the glass articles, such as bottles, in thickness varying from 4 to 7 mils, to provide the desired protection from mar, scratching, bumps, and to prevent scattering of the glass on breakage.

The 2-norbornenes useful in the copolymers are 2-norbornene itself, the 5-methyl derivative and the 5-ethyl derivative. Norbornene is available from several commercial sources. The 5-alkyl derivatives are prepared by Diels-Alder reaction between dicyclopentadiene and the appropriate olefin, such as propylene or 1-butene, by the method described by H. Koch and W. Haas, Annalen 638, 111 (1960).

The narrow distribution co- and terpolymers are prepared as follows:

Catalyst Preparation

A dry 300 ml round bottom flask equipped with a magnetic stirrer, thermometer, and nitrogen inlet and outlet was dried in an oven at 120° C. and cooled under a nitrogen purge. The flask was immersed in a dry ice-methanol bath at $-75°$ C. and sufficient dry hexane to give the desired normality (usually 15N, where 1N=8.7 millimoles $TiCl_4$ per liter hexane) was added followed by the desired aliquot of diisobutyl aluminum hydride (as a 0.5 molar solution in hexane). The solution was allowed to cool with stirring to bath temperature. To the cooled solution was added an aliquot of titanium tetrachloride (as 0.5 molar sollution in hexane). A brown precipitate formed and the mixture was stirred for 5 minutes, an aliquot of tetra-isobutyl titanate (as 0.25 molar solution in hexane) was added and the mixture was stirred for 15 minutes with the bath at $-75°$ C. The temperature was then allowed to rise to $+40°$ C. over a 10 minute period and heating with stirring was continued at 40° C. for an additional 5 minutes. Heating was done with a heat lamp. The resulting catalyst was transferred to the polymerization reactor as needed by syringe.

Polymerization

Polymerizations were carried out in a 2 liter glass bowl reactor agitated with an air driven "Magna-Drive" stirrer. The glass bowl was oven dried at 120° C., bolted to the reactor, evacuated for 20 minutes, then purged with dry nitrogen before charging with 1500 ml dry hexane (passed over Linde 13X molecular sieves). The temperature in the reactor was adjusted to 40° C. and the catalyst from the catalyst flask was added under a nitrogen flush. The reactor was capped and nitrogen pressure vented before admitting hydrogen to the reactor for melt index control. If terpolymer was being prepared, liquid butene-1 was admitted to the reactor from a pressure buret. The temperature was rapidly increased to 80° C. and an aliquot of norbornyl olefin in dry hexane was added from a pressure buret. Polymerization was initiated by admitting ethylene to the reactor from a hold tank. Total pressure in the reactor was maintained at 50 psi. Ethylene absorption was monitored by following the pressure drop in the hold tank. Within the pressure range of 100 to 180 psi, a 5 psi pressure drop in the hold tank was equivalent to 15 g ethylene. At every 5 psi drop in the ethylene hold tank, a 10 ml addition of norbornene solution was made to the reactor. The reaction was terminated by stopping the flow of ethylene to the reactor and reducing the temperature to 50° C. The reactor was vented and catalyst was solubilized by the addition of 300 ml methanol and heating at 80°–85° C. for 30 minutes. Product was isolated by filtration on a Buchner funnel with several methanol washings. Alternatively, catalyst residues were preferably removed by extraction or decantation of the reactor slurry with methanol and 80/20 methanol-water solutions. Terpolymer was best obtained as a powder by screening the wet cake thru a 40 mesh sieve (flour sifter) then drying on a fluid bed drier.

Coating of Bottles

The polymer powders to be tested were sieved to obtain powders of from 35 to 75 microns particle size and sprayed electrostatically onto 48 ounce, non-returnable Coke bottles which were preheated to 350° F. surface temperature. The coatings were post cured at 500° F. to a 400°–410° F. melt temperature; fan-cooled to 270° F.; water-quenched to 175°–190° F. The powders were applied at thicknesses of between 4.0 and 7.0 mils.

Carbonation and Drop-Test Procedure

Each bottle was charged with 48 fluid ounces of water and pressurized to 60 psig at 70° F. The bottles were shaken periodically after the initial charge and stored at 70° F. overnight before drop testing.

Horizontal drop tests at 48 inches were made onto a concrete slab which had been marked off in concentric circular zones radiating from the point of impact at 3 foot diameter increments. The percentage by weight of glass retained within the target, or first zone, is reported as "percent glass retention." "Scatter Index" is a weighted average of the amount and distance which glass is thrown from an exploding bottle. Favorable glass scatter results are considered to be 98 or higher percent glass retention and scatter index of 2 or less.

Bottle transparency is a subjective measurement listed on a scale of decreasing transparency of 1 to 6. The measurements were tested by viewing a fluorescent light placed behind the bottles from a distance of about 10 feet.

EXAMPLES

In order to illustrate the invention, several polymers were prepared, coated on bottles and evaluated. The values for a bottle coated with Surlyn AD 5001, a salt of an ethylene-methacrylic acid copolymer sold by E. I. duPont de Nemours, Inc., are given for comparison, along with the results shown in the Table.

TABLE

| Run No. | Mole % Norbornene | Mole % Butene | Density g./cc. | $MI_{10}/MI_2$ | Glass Retention, % | Scatter Index | Bottle Transparency |
|---|---|---|---|---|---|---|---|
| Control | Ethylene | Methacrylic | 0.949 | — | 99.3 | 0.70 | 1 |
| 1 | — | 4–5 | 0.934 | — | 96.8 | 2.80 | 4 |
| 2 | 5.6 | — | 0.949 | 7.7 | 100 | 0.0 | 4 |
| 3 | 2.75 | — | 0.949 | 7.4 | 98.4 | 1.46 | 3 |
| 4 | 2.75 | 0.60 | 0.939 | 7.5 | 99.9 | 0.03 | 2 |
| 5 | 1.80 | 0.90 | 0.938 | 7.4 | 98.9 | 1.38 | 3 |
| 6 | 2.0 | 0.61 | 0.939 | 7.5 | 99.9 | 0.11 | 5 |
| 7 | 2.6 | 0.96 | 0.940 | 7.2 | 95.7 | 3.2 | 4 |
| 8 | 3.00 | 1.80 | 0.928 | 7.8 | 95.7 | 3.44 | 3 |
| 9 | 2.75* | 0.90 | 0.938 | 7.9 | 99.9 | 0.01 | 3 |
| 10 | 2.75* | 0.90 | 0.938 | 7.5 | 100 | 0 | 3 |
| 11 | 2.00* | 1.20 | 0.934 | 7.3 | 99.9 | 0.07 | 3 |
| 12 | 4.00** | 0.60 | 0.943 | 8.2 | 99.3 | 0.64 | 3 |

*5-Methyl-2-norbornene
**5-Ethyl-2-norbornene

We claim:

1. A resin:coated glass article consisting of a glass having on its outer surface a 4–7 mil thick film of a polymer composition made from 91.5 to 98.5 mole percent of total polymer of ethylene, 0.0 to 2.5 mole percent of 1-butene, and 1.5 to 6.0 mole percent of a monomer selected from the group consisting of 2-norbornene, 5-methyl-2-norbornene, and 5-ethyl-2-norbornene; said polymer composition having a density of between 0.930 and 0.950 grams per cubic centimeter and a narrow molecular weight distribution of less than 10 as measured by the ratio of melt index under 10 kilograms load to melt index under 2 kilograms load at 190° C.

2. The glass article of claim 1 wherein the article is a bottle.

UNITED STATES PATENT OFFICE
CERTIFICATE OF CORRECTION

PATENT NO. : 4,153,171
DATED : May 8, 1979
INVENTOR(S) : R. James Kersting and James J. Harris It is certified that error appears in the above-identified patent and that said Letters Patent are hereby corrected as shown below:

Claim 1, line 1, change "resin:coated" to ...resin-coated...

Claim 1, line 1, after "glass" insert ...article...

Signed and Sealed this

Twenty-fifth Day of September 1979

[SEAL]

Attest:

LUTRELLE F. PARKER

Attesting Officer     Acting Commissioner of Patents and Trademarks